Patented Sept. 25, 1951

2,568,784

UNITED STATES PATENT OFFICE 2,568,784

REACTION PRODUCTS OF OLEFIN OXIDES AND P₂O₅ OR P₂S₅ AND THE METHOD OF FORMING THE SAME

Willard H. Woodstock, Lincolnshire, Crete, Ill., assignor to Victor Chemical Works, a corporation of Illinois No Drawing. Application July 18, 1950, Serial No. 174,574

14 Claims. (Cl. 260—2)

This invention relates to reaction products of olefine oxides and phosphoric anhydride or phosphorus pentasulfide and the method of forming the same.

This application is a continuation-in-part of my abandoned copending application Serial No. 103,538, filed July 7, 1949, which in turn is a continuation-in-part of abandoned application Serial No. 600,656, filed June 20, 1945. This latter application is a division of abandoned application Serial No. 492,574, filed June 28, 1943.

The new reaction products are prepared by reacting either phosphoric anhydride or phosphorus pentasulfide with an olefine oxide having the formula:

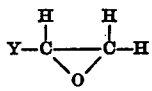

where Y is either an alkyl group containing from 1 to 2 carbon atoms, an aryl group, a hydrogen atom, a chloromethyl radical or a hydroxymethyl radical. The reacting proportions are preferably from 3 to 7 moles, inclusive, of the olefine oxide per mole of the phosphorus compound. These reaction products are addition reaction products and may be prepared either in the form of monomers or polymers. The monomers are substantially water-soluble, while the polymers are at most only very slightly water-soluble.

Although the exact mechanics of the reaction and the structure of the reaction product are not known, I believe that the phosphorus anhydride molecule should be represented as $P_4O_{10}$, with a tetrahedryl structure in which only two types of oxygen bonds are present. In this structure, each phosphorus atom has one oxygen double bonded to the phosphorus to form a stable bond. All other oxygen atoms are bridging connections between two phosphorus atoms. Such an arrangement is illustrated in the following structure:

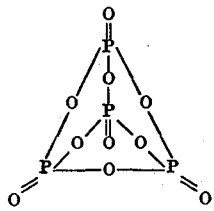

With phosphorus pentasulfide, the oxygen will be replaced with sulfur atoms, but the structure will be the same. With this type of structure the olefine oxide molecules add only with the bridging oxygen bonds and not with those oxygens that are double bonded to the phosphorus atoms. The theory is that where one olefine oxide molecule is added at each connecting bond, a fairly stable product is obtained that is not easily polymerized. Such a product occurs when the olefine oxide is epichlorohydrin as illustrated in an example presented hereinafter. If more than one molecule of an olefine oxide is introduced at any connecting bond, the structure would become more expanded and less stable, and on heating or aging the expanded connection links might break giving the product the polyfunctional character necessary for polymerization. Under this theory, the polyfunctional monomers may be illustrated as follows:

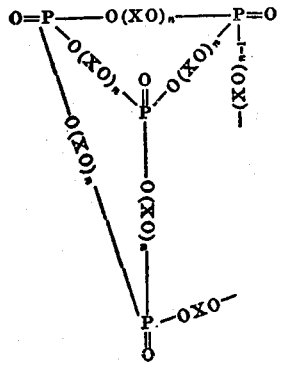

The above illustration, for the sake of simplicity, shows only one connection link broken at the point of multiple addition of olefine oxide molecules. Obviously this situation may be present at one or more of the connection links depending on the value of $n$ and the heating or polymerizing conditions. In the above formula XO is an oxyalkylene group, $n$ is a small whole number and the oxygen that is double bonded to the phosphorus may be replaced by sulfur. The free valence bonds indicate the polymerizable nature or functional characteristics of the product. The value of $n$ depends on the amount of the olefine oxide that is introduced or the nature of the olefine oxide. Ordinarily $n$ will be either 1 or 2, but it may be a larger number, particularly where the reaction is carried out under high pressure.

The above discussion of the theory of the reaction is presented only to illustrate the scope of the invention. I do not wish to be limited by these theoretical observations, however, as they have not been proven to be actual fact although the theory is based on the results of a large number of experimental tests. The examples presented below illustrate the invention in terms of the $P_2O_5$ structure originally designated as the formula for the phosphoric anhydride in view of the probability that the monomer molecule will contain only two atoms of phosphorus. The proportions disclosed in the claims are based on phosphoric anhydride having the formula $P_2O_5$.

Example 1

10 grams of phosphoric anhydride and 250 cc. of dry chloroform were placed in a 500 cc. flask equipped with a reflux condenser, stirrer, thermometer, gas inlet tube and water bath. About 50 cc. of ethylene oxide was vaporized into the flask. Unreacted phosphoric anhydride was filtered off, and the chloroform removed in vacuo up to 75° C. bath temperature. A colorless, slightly acid, water-soluble liquid remained. The product slowly polymerized on standing at room temperature, while on heating at 85° C. or higher, it rapidly became thicker, and at 100° C. it gelled into a rubber-like polymer. When heated at 130° C. for 2.5 hours, a slightly colored, clear, resilient solid resembling art gum was formed. This solid product was substantially insoluble in water. Analysis showed a 40.0% $P_2O_5$ content which corresponded to the equation:

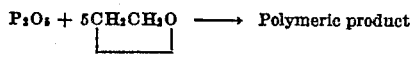

Example 2

In another and similar test the reaction of the phosphoric anhydride and ethylene oxide was allowed to proceed over a much longer period of time. The isolated liquid product in this case analyzed 31.6% $P_2O_5$ which exactly corresponded to the reaction of 7 moles of ethylene oxide with 1 mole of phosphoric anhydride. This product slowly polymerized over several days at room temperature to form a rubber-like, clear solid which was no longer water-soluble. Some of the liquid product heated at 135° C. for 2.5 hours also polymerized to a rubber-like product. Based on the analysis of the polymer and the nature of the starting materials, the following formula indicates the probable structure of the polyfunctional monomer:

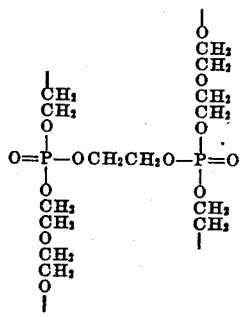

In the case of the reaction product involving only 5 moles of ethylene oxide per mole of phosphoric anhydride as in Example 1, the polyfunctional monomer probably has the following structure:

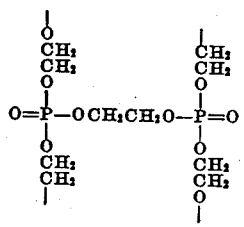

Under different reacting conditions of temperature and pressure, additions will occur with varying ratios of reactants.

Example 3

81.5 grams of epichlorohydrin was slowly added to 25 grams of phosphoric anhydride slurried in 200 cc. of dry chloroform. No appreciable reaction took place until the mixture was heated to about 40° C. The bath was held at a temperature of 50 to 60° C. for about 5 hours. The resulting homogeneous solution was filtered and the solvent removed by vacuum distillation at 65 to 70° C. The analysis of the viscous liquid product showed that 3 moles of the epichlorohydrin had reacted with one of phosphoric anhydride. No visible evidence of polymerization was noted on heating the product to 140° C., however.

Example 4

40 grams of powdered phosphorus pentasulfide was slurried in 200 cc. dry benzene and liquid ethylene oxide was added in 25 cc. portions until an excess was present. There was a rise in temperature to 40° C. indicating that a slow reaction was taking place. After stirring for 12 hours at room temperature the solvent and excess ethylene oxide were removed by evaporating on a water bath in vacuo. The product was a soft, yellow powder which was insoluble in water and not acid to methyl orange. It analyzed 17.3% P which corresponded to the calculated value of 17.5% P for the reaction of 3 moles of ethylene oxide and one mole of $P_2S_5$.

In the above examples the reacting conditions have been at atmospheric pressure, without the use of catalysts, and in general at temperatures not exceeding 60° to 70° C. An inert solvent or suspension medium has been used in some cases to facilitate contact of the reactants. Non-aqueous conditions were employed to avoid undesired reaction between the olefine oxide and water.

The primary olefine oxide such as ethylene oxide is somewhat more reactive than the secondary and tertiary olefine oxides such as isopropylene and isobutylene oxides though valuable products may be produced with the latter.

The products of this invention include monomers, polymers and partially polymerized reaction products and are made by reacting the ethylene oxide with either phosphoric anhydride or phosphorus pentasulfide. Thus both the phosphoric anhydride and the phosphorus pentasulfide are equivalents.

The monomers, polymers and partially polymerized reaction products of this invention have a number of important uses. As the monomers are substantially water-soluble while the polymers are at most only very slightly soluble, these properties can be utilized in impregnating fibrous material such as wood, paper, fabrics and the like with the liquid monomers or partial polymers, then heating to cause the impregnant to polymerize to impart a flame resistant quality to the impregnated material. Thus, flammable materials may be made flame resistant as exemplified in the "glow" proofing of match sticks and the like. As the monomers hydrolyze more readily than the polymers with the development of acidic conditions, the material may be used in acid curing of resin products wherein the rate of acid development can be controlled by selection of products having the desired degree of polymerization. This characteristic makes the reaction products useful as dyebath assistants where a slow development of acidity is required. The reaction products also have utility in preparing rust-proofing and electropolishing compositions and may be used as intermediates for the production of polyglycol phosphate esters. By controlling the rate of polymerization of the polymers, products may be obtained having various rubber-like characteristics that make the polymers useful as substitutes for rubber in certain applications such as in the production of resilient padding for automobile floor covering fabrics and the like.

A particular use for the new reaction products has been as curing agents on resin films of the urea-formaldehyde types. In one test a urea-formaldehyde etherified type resin was used. This resin was prepared in the following manner.

486 grams of 37% aqueous formaldehyde was brought to a pH between 7.5 and 8.5 with aqueous ammonia. While agitating, 120 grams of urea was added and the mixture heated to boiling in one hour and boiled for thirty minutes. 296 grams of n-butanol was then added and the pH adjusted to 5.5–6.5 with 85% phosphoric acid. The mixture was again boiled for 30 minutes and then allowed to stand overnight at room temperature. The water and butanol were distilled off at 60° to 70° C. under vacuum (100–200 mm. Hg). The residue was a water-white sticky resin having a nitrogen content of 11.8%. 80 grams of this resin were dissolved in 53 grams of n-butanol to give a 60% solution.

A 6 gram portion of the above solution was mixed with 1 gram of a butanol solution of the reaction product of Example 2 of the specification prepared by dissolving 5 grams of the partially polymerized reaction product of one mole $P_2O_5$ and seven moles ethylene oxide in 10 grams n-butanol.

Comparative coatings of the above two resin solutions were prepared by applying the solutions to the surfaces of clean brass strips and then heating them for twenty minutes at 85° C. in an air oven to facilitate the curing. Both coatings were hard and glassy in appearance, though that produced from the $P_2O_5$ ethylene oxide containing product could not be scratched or peeled with the fingernail whereas the coating produced from the uncatalyzed urea-formaldehyde material could be scratched and peeled.

Having described my invention in considerable detail, it is my intention that the invention be not limited by any of the details of description unless otherwise specified, but rather be construed broadly within its spirit and scope as set out in the accompanying claims.

I claim:

1. The method of forming an addition reaction product which comprises reacting under non-aqueous conditions a member of the class consisting of phosphorus pentasulfide and phosphoric anhydride with an olefine oxide having the formula

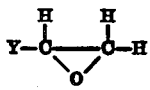

where Y is a member of the class consisting of an alkyl group containing from one to two carbon atoms, an aryl group, a hydrogen atom, a chloromethyl radical and a hydroxymethyl radical, the reacting proportion being from 3 to 7 moles, inclusive, of the olefine oxide per mole of the phosphorus compound.

2. The method as set out in claim 1 wherein the phosphorus compound is phosphoric anhydride.

3. The method as set out in claim 1 wherein the phosphorus compound is phosphorus pentasulfide.

4. The method as set out in claim 1 wherein the olefine oxide is ethylene oxide.

5. The method as set out in claim 1 wherein the reacting materials are ethylene oxide and phosphoric anhydride.

6. The method as set out in claim 1 wherein the reacting materials are ethylene oxide and phosphorus pentasulfide.

7. The reaction product of a member of the class consisting of phosphorus pentasulfide and phosphoric anhydride with an olefine oxide having the formula

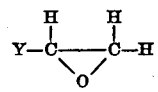

where Y is a member of the class consisting of an alkyl group containing from one to two carbon atoms, an aryl group, a hydrogen atom, a chloromethyl radical and a hydroxymethyl radical, the reacting proportions being from 3 to 7 moles, inclusive, of the olefine oxide per mole of the phosphorus compound.

8. The reaction product as set forth in claim 7 wherein the phosphorus compound is phosphoric anhydride.

9. The reaction product as set forth in claim 7 wherein the phosphorus compound is phosphorus pentasulfide.

10. The reaction product as set forth in claim 7 wherein the olefine oxide is ethylene oxide.

11. The reaction product as set forth in claim 7 wherein the phosphorus compound is phosphoric anhydride and the olefine oxide is ethylene oxide.

12. The reaction product as set forth in claim 7 wherein the phosphorus compound is phosphorus pentasulfide and the olefine oxide is ethylene oxide.

13. A resilient solid composition consisting of the polymer of the reaction product of 5 moles of ethylene oxide with each mole of phosphoric anhydride.

14. A resilient solid composition consisting of the polymer of the reaction product of 7 moles of ethylene oxide with each mole of phosphoric anhydride.

WILLARD H. WOODSTOCK.

No references cited.